G. W. FARR.
BALANCE BALL FOR SCALES.
APPLICATION FILED AUG. 12, 1915.
1,186,761.
Patented June 13, 1916.
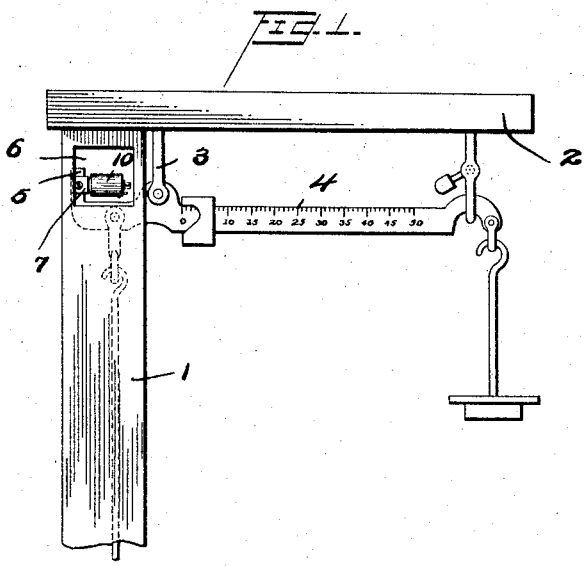
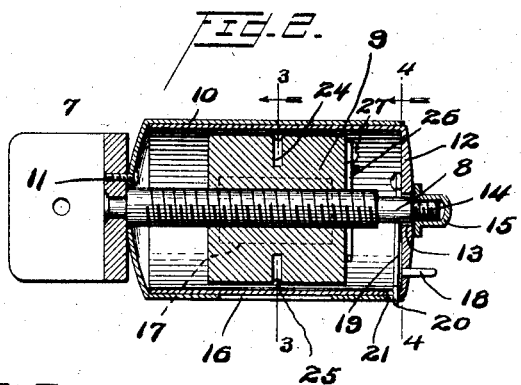
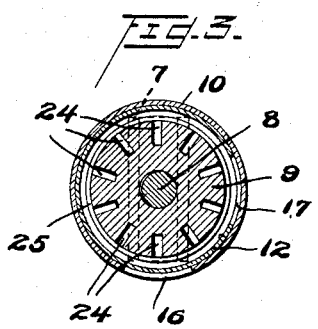
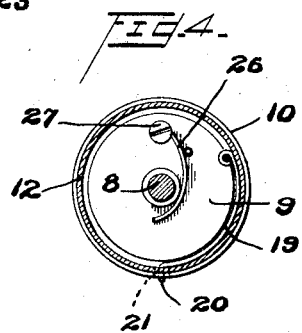
Witnesses
Harold Strauss
Ralph Pimes
Inventor
George W. Farr
By
Herbert J. Jacobi
Attorney
THE COLUMBIA PLANOGRAPH CO., WASHINGTON, D. C.

UNITED STATES PATENT OFFICE.

GEORGE W. FARR, OF ST. JOHNSBURY, VERMONT.

BALANCE-BALL FOR SCALES.

1,186,761.  Specification of Letters Patent.  Patented June 13, 1916.

Application filed August 12, 1915. Serial No. 45,180.

*To all whom it may concern:*

Be it known that I, GEORGE W. FARR, a citizen of the United States of America, residing at St. Johnsbury, in the county of Caledonia and State of Vermont, have invented certain new and useful Improvements in Balance-Balls for Scales, of which the following is a specification.

This invention relates to new and useful improvements in weighing devices and more particularly to a balance ball for a scale beam, and the primary object of the invention is to provide a device of this character which is entirely concealed, thus admitting of adjustment only by authorized persons.

A further object of the invention resides in providing an automatically locked casing for the balance ball which entirely incloses said ball and prevents persons tampering therewith.

Still another object of the invention resides in providing an improved casing for the balance ball which is formed of telescopic cylindrical sections, the inner section being rotatable with respect to the outer section and locking automatically at a predetermined position of said sections.

A still further object resides in providing an instrument for releasing the automatic lock between the sections and which instrument is also adapted for use in the adjustment of the balance ball of the spindle.

With these and other objects in view my invention consists in the novel features of construction, combination and arrangement of parts as will be hereinafter referred to and more particularly pointed out in the specification and claims.

In the accompanying drawing forming a part of this application:—Figure 1 is a side elevation of a platform scale of the usual or any preferred type having my improved invention embodied therein; Fig. 2 is an enlarged section through the balance ball and casing therefor applied to use; Fig. 3 is a transverse section as seen on the line 3—3 of Fig. 2, looking in the direction of the arrow; Fig. 4 is a similar view as seen on the line 4—4 of Fig. 2, looking in the direction of the arrow; and Fig. 5 is an elevation of the hook member which is used for the operation of the device.

In describing the invention I shall refer to the drawing in which similar reference characters indicate corresponding parts throughout the several views and in which 1 indicates a standard of the usual or any preferred form of platform scale on the upper end of which is rigidly mounted a usual horizontally disposed beam 2. Suspended from this beam is a hanger 3 to which is fulcrumed a scale beam 4, the latter operating as usual through a slot (not shown) in the side edge of the standard 1 so that the inner end of said scale beam disengaged as 5 may be observed through an opening 6 formed in the upper portion of the standard. The beam 4 and the other adjacent parts of the device are constructed as usual and secured on the upwardly bent inner end 5 of the beam is a bracket 7 which has an outwardly extending threaded spindle 8 secured thereto. Threaded on the spindle 8 is the member 9 which is substantially cylindrical having a threaded bore and which may be termed the balance ball. In most scales of this type the balance ball is unconcealed being carried on the threaded spindle and capable of adjustment at the will of any one observing same. Thus, any one may tamper therewith and throw the scale out of proper adjustment and my invention contemplates the provision of a means to prevent tampering with such balance balls and permit only authorized persons to adjust the same. In carrying out this end, I provide a shell which consists of an outer substantially cylindrical casing 10, the latter being secured as designated at 11 to the bracket 7, and an inner substantially cylindrical casing 12, which is telescoped within the casing 11, as clearly shown in Fig. 2 of the drawing. The outer end of the outer section 11 is open while the inner end of the inner section 12 is open, but the closed end of the inner section 12 forms an outer end closure for the shell and has an opening 13 therein to admit the outer end of the spindle 8 to project therethrough. The extreme outer end of this spindle 8 is reduced and threaded as shown at 14 and a nut 15 engaged therewith, which nut retains the inner section of the shell in place, but admits of the latter being rotated within the outer section of the shell.

The outer section 10 of the shell has an enlarged opening 16 therein which faces downwardly and when the same is properly secured to the bracket 7 and the inner section 12 of the shell has a similar opening 17 therein which is adapted to register with the opening 16 when the inner section is disposed to a predetermined position. This inner section may be rotated within the outer section of the shell by means of a finger piece 18 which is carried on the outer end of said inner section. I have provided a means, however, whereby the inner section may be locked with respect to the outer section and the opening in the former disposed out of registration with the opening in the latter and thus entirely inclosing and concealing the balance ball within the shell. To this end I provide an arcuate spring member 19 which is secured to the inner face of the outer wall of the inner shell 12. The free end of this arcuate spring member 19 is bent to form a locking end 20 entering a pair of registering openings 21 formed in the sections 10 and 12 of the shell, as clearly shown in Figs. 2 and 4 of the drawing. It will be seen that when this locking end 20 of the spring member 19 is disengaged with the openings 21, the inner section may be readily rotated within the outer section of the shell, to admit of the openings 16 and 17 to register and enable one to operate the balance ball 9. When locked, however, as shown in Figs. 2 and 3 of the drawings, the inner section may not be rotated until such time as the spring pin is disengaged with the openings 20. In order to disengage the spring pin so as to rotate the inner section within the outer section of the casing, I provide a hand operating instrument 22 which is in the form of a pin, the outer end of which is bent laterally and tapered as shown at 23. In order to unlock the device, therefore, the instrument 22 is disposed so that the end 23 thereof enters the openings 21 to force the spring pin 20 upwardly in the shell, when this is done with one hand the other hand may rest the finger piece 18 to rotate the inner section of the shell. After the inner section has been rotated slightly so that the spring pin is disengaged, the inner section of the shell may be readily disposed so that the openings 16 and 17 register one with the other. The balance ball may then be adjusted accordingly.

The balance ball 9 is provided about centrally with a plurality of inwardly extending slots 24, which may be readily engaged by the hooked end 23 of the instrument 22. The balance ball may, therefore, be readily rotated on the spindle 8 by engaging the openings or slots 24 with the instrument 22. In order to aid this operation of the device, an annular groove 25 is provided in the outer periphery of the balance ball which intersects the various slots 24. The end 23 of the instrument may be guided into the various slots by permitting the same to constantly rest in the groove 25. The balance ball 9 is prevented from casual movement on the spindle by means of an arcuate spring member 26 which has its one end secured to the end of the balance ball by a screw 27 and the other end free, as shown in Fig. 4 of the drawing. This arcuate spring member, however, rests firmly against the spindle 8, as shown, and the ball cannot be casually displaced at any time.

From the foregoing description of the construction of my improved device, the manner of applying the same to use and the operation thereof will be readily understood and it will be seen that I have provided a simple, inexpensive, and efficient means for carrying out the objects of the invention.

While I have particularly described the elements best adapted to perform the functions set forth, it is obvious that various changes in form, proportion and in the minor details of construction may be resorted to, within the scope of the appended claims, without departing from the spirit or sacrificing any of the principles of the invention.

What I claim and desire to secure by Letters Patent, is:—

1. In a scale, the combination with a beam and a balance ball adjustably mounted thereon; of a shell for concealing the balance ball from view, said shell being formed of telescoping sections each having a registering opening therein, whereby to gain entrance to the shell for adjustment of the balance ball and means for locking the sections of the shell so that the openings are out of registration.

2. In a scale, the combination with a beam and a balance ball adjustably mounted thereon; of a shell for concealing the balance ball from view consisting of an outer cylindrical casing secured to the beam, an inner casing rotatably mounted in the first mentioned casing, each of said casings having an opening therein adapted for registration to gain entrance to the shell for adjustment of the balance ball, and means for locking the inner section against rotation and simultaneously covering the opening in the outer casing.

3. In a scale, the combination with a beam, and a balance ball adjustably mounted thereon; of a shell concealing the balance ball and consisting of an outer cylindrical section secured to the beam, an inner cylindrical section rotatably mounted in the outer section, each of said sections being provided with an enlarged opening adapted for registration, whereby to gain entrance to the shell for adjusting the balance ball, means for rotating the inner section of the shell, and means for automatically locking the inner section against rotation and simultaneously covering the opening in the outer section to entirely conceal the balance ball therein.

4. In a scale, the combination with a beam and a balance ball adjustably mounted thereon; of a shell inclosing said balance ball and comprising an outer cylindrical casing secured to the beam, an inner cylindrical casing rotatably mounted in the first mentioned casing, both of said casings having an enlarged opening therein adapted for registration to gain entrance to the shell, said casings being also provided with additional registering openings adapted for registration only when the aforesaid openings are not in registration, means for rotating the inner casing within the outer casing of the shell and a spring locking member adapted to automatically enter the last mentioned registering openings when the inner casing is rotated to a predetermined position.

5. In a scale, the combination with a beam, a threaded spindle carried thereon, and a balance ball adjustably mounted on said spindle; of a shell for inclosing the said balance ball consisting of an outer cylindrical casing rigidly secured to the beam and having its outer end open, an inner cylindrical casing rotatably mounted therein and having its inner end open, the outer end of said inner casing being provided with a central opening to receive the outer end of the spindle therethrough, a nut engaged with the outer end of said spindle to retain the inner section of the shell in rotatable position within the outer casing thereof, said inner and outer casings of the shell being provided with openings adapted for registration whereby entrance may be had to the shell for the actuation of the balance ball, means for rotating the inner casing of the shell and means for locking the said last mentioned casing against rotation at a predetermined position, whereby the shell entirely conceals the balance ball.

In testimony whereof I affix my signature in the presence of two witnesses.

GEORGE W. FARR.

Witnesses:
WILLIAM E. RACETTE,
ALLEN C. UNDERWOOD.

Copies of this patent may be obtained for five cents each, by addressing the "Commissioner of Patents, Washington, D. C."